US012676786B1

(12) United States Patent
Huang et al.

(10) Patent No.: US 12,676,786 B1
(45) Date of Patent: Jul. 7, 2026

(54) FAILOVER MONITORING USING DYNAMIC TRAFFIC TAGGING

(71) Applicant: Zoom Video Communications, Inc., San Jose, CA (US)

(72) Inventors: Daofu Huang, Hefei (CN); Zhuo Li, Hangzhou (CN); Dong Lin, Hefei (CN); Xiaohuan Pan, Hangzhou (CN); Guobing Sang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 350 days.

(21) Appl. No.: 18/422,432

(22) Filed: Jan. 25, 2024

(51) Int. Cl.
H04L 41/0663 (2022.01)
(52) U.S. Cl.
CPC ................................ H04L 41/0663 (2013.01)
(58) Field of Classification Search
CPC .................................................. H04L 41/0663
See application file for complete search history.

(56) References Cited

U.S. PATENT DOCUMENTS

| | | | | |
|---|---|---|---|---|
| 11,516,266 | B1 * | 11/2022 | Ramachandran | ....... H04L 65/60 |
| 2007/0234115 | A1 * | 10/2007 | Saika | ................... G06F 11/2028 |
| | | | | 714/13 |
| 2019/0334761 | A1 * | 10/2019 | Yadav | ................. G06F 11/1461 |
| 2023/0267035 | A1 * | 8/2023 | Hogan | .................. G06F 11/142 |
| | | | | 714/38.1 |

* cited by examiner

*Primary Examiner* — Won Tae C Kim
(74) *Attorney, Agent, or Firm* — Kilpatrick Townsend & Stockton, LLP

(57) ABSTRACT

Systems and methods for failover monitoring using dynamic traffic tagging are disclosed. In an example method, a computing device outputs failover information including a designation of a current failover location. The computing device receives, from a server device, a failover status message indicating that the server device received a request message including the current failover location. The computing device then outputs a second failover information including a second designation of a second network location as the current failover location. The computing device receives from the server device, a second failover status message indicating that the server device received a second request message including a network location other than the current failover location. The computing device then outputs a failover failure notification and outputs a command to cause a corrective action.

20 Claims, 9 Drawing Sheets

700

OUTPUT FIRST FAILOVER INFORMATION A FIRST DESIGNATION OF A FIRST NETWORK LOCATION AS A CURRENT FAILOVER LOCATION
710

RECEIVE, FROM A FIRST SERVER DEVICE, A FIRST FAILOVER STATUS MESSAGE INCLUDING AN INDICATION THAT THE FIRST NETWORK LOCATION MATCHES THE CURRENT FAILOVER LOCATION
720

OUTPUT SECOND FAILOVER INFORMATION INCLUDING A SECOND DESIGNATION OF A SECOND NETWORK LOCATION AS THE CURRENT FAILOVER LOCATION
730

RECEIVE, FROM THE FIRST SERVER DEVICE, A SECOND FAILOVER STATUS MESSAGE INCLUDING AN INDICATION THAT THE FIRST NETWORK LOCATION DOES NOT MATCH THE CURRENT FAILOVER LOCATION
740

OUTPUT A FAILOVER FAILURE NOTIFICATION INCLUDING AN INDICATION THAT THE FIRST NETWORK LOCATION DOES NOT MATCH THE CURRENT FAILOVER LOCATION
750

RESPONSIVE TO THE FIRST NETWORK LOCATION NOT MATCHING THE CURRENT FAILOVER LOCATION, OUTPUT A FAILOVER CORRECTIVE ACTION INCLUDING A COMMAND TO CAUSE A CORRECTIVE ACTION
760

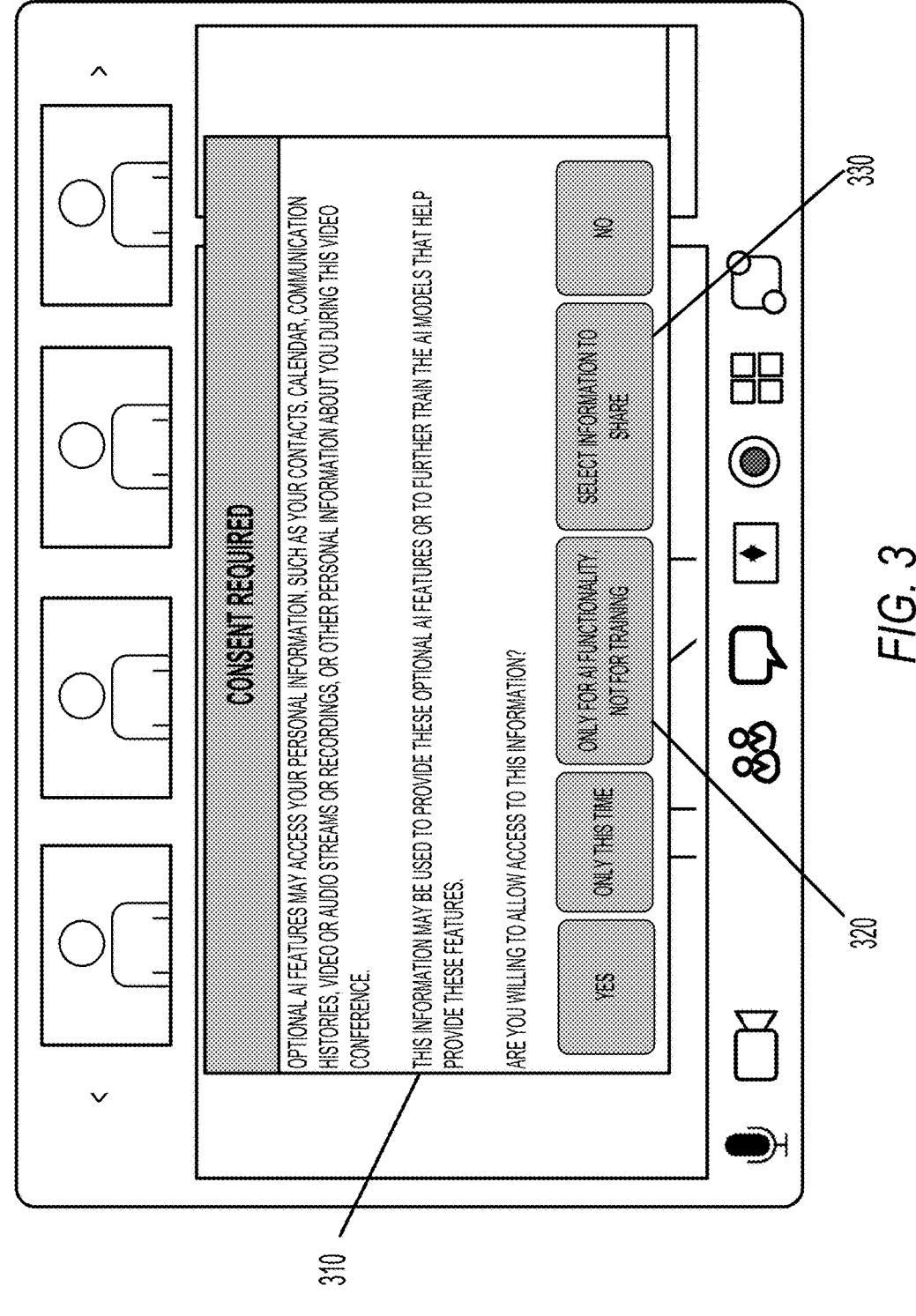

CONSENT REQUIRED

OPTIONAL AI FEATURES MAY ACCESS YOUR PERSONAL INFORMATION, SUCH AS YOUR CONTACTS, CALENDAR, COMMUNICATION HISTORIES, VIDEO OR AUDIO STREAMS OR RECORDINGS, OR OTHER PERSONAL INFORMATION ABOUT YOU DURING THIS VIDEO CONFERENCE.

THIS INFORMATION MAY BE USED TO PROVIDE THESE OPTIONAL AI FEATURES OR TO FURTHER TRAIN THE AI MODELS THAT HELP PROVIDE THESE FEATURES.

ARE YOU WILLING TO ALLOW ACCESS TO THIS INFORMATION?

YES    ONLY THIS TIME    ONLY FOR AI FUNCTIONALITY NOT FOR TRAINING    SELECT INFORMATION TO SHARE    NO

```
{
    "svg": "SVC-GRP-1",
    "from": "AZ1",
    "eventType": "failover",
    "to": "AZ2",
    "timestamp": 1671355549356
}
```

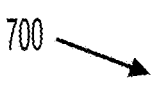
700

OUTPUT FIRST FAILOVER INFORMATION A FIRST DESIGNATION OF A FIRST NETWORK LOCATION AS A CURRENT FAILOVER LOCATION
710

RECEIVE, FROM A FIRST SERVER DEVICE, A FIRST FAILOVER STATUS MESSAGE INCLUDING AN INDICATION THAT THE FIRST NETWORK LOCATION MATCHES THE CURRENT FAILOVER LOCATION
720

OUTPUT SECOND FAILOVER INFORMATION INCLUDING A SECOND DESIGNATION OF A SECOND NETWORK LOCATION AS THE CURRENT FAILOVER LOCATION
730

RECEIVE, FROM THE FIRST SERVER DEVICE, A SECOND FAILOVER STATUS MESSAGE, INCLUDING AN INDICATION THAT THE FIRST NETWORK LOCATION DOES NOT MATCH THE CURRENT FAILOVER LOCATION
740

OUTPUT A FAILOVER FAILURE NOTIFICATION INCLUDING AN INDICATION THAT THE FIRST NETWORK LOCATION DOES NOT MATCH THE CURRENT FAILOVER LOCATION
750

RESPONSIVE TO THE FIRST NETWORK LOCATION NOT MATCHING THE CURRENT FAILOVER LOCATION, OUTPUT A FAILOVER CORRECTIVE ACTION INCLUDING A COMMAND TO CAUSE A CORRECTIVE ACTION
760

*FIG. 7*

```
RECEIVE, BY A SERVER DEVICE AT A FIRST NETWORK LOCATION, A
REQUEST MESSAGE THAT DOES NOT INCLUDE THE CURRENT
FAILOVER LOCATION
810
```

```
DETERMINE, BY A SERVER AT A FIRST NETWORK LOCATION, THAT THE
FIRST NETWORK LOCATION DOES NOT MATCH THE CURRENT FAILOVER
LOCATION
820
```

```
UPDATE THE REQUEST MESSAGE TO INCLUDE THE CURRENT FAILOVER
LOCATION
830
```

```
OUTPUT THE REQUEST MESSAGE TO CAUSE THE REQUEST MESSAGE
TO BE FORWARDED TO A SECOND NETWORK LOCATION
840
```

```
RECEIVE, BY A SERVER DEVICE AT A SECOND NETWORK LOCATION,
THE THIRD MESSAGE
850
```

```
RECEIVE, FROM THE SERVER DEVICE AT THE SECOND NETWORK
LOCATION, A FAILOVER STATUS MESSAGE
860
```

*FIG. 8*

FAILOVER MONITORING USING DYNAMIC TRAFFIC TAGGING

FIELD

The present application generally relates to disaster recovery during network administration, and more particularly relates to techniques for failover monitoring using dynamic traffic tagging.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 3 shows an example user interface that may be used in some example systems configured for failover monitoring using dynamic traffic tagging, according to some aspects of the present disclosure.

FIG. 7 shows a flowchart of an example method for failover monitoring using dynamic traffic tagging, according to some aspects of the present disclosure.

FIG. 8 shows a flowchart of an example method for failover monitoring using dynamic traffic tagging, according to some aspects of the present disclosure.

DETAILED DESCRIPTION

Figure 1:
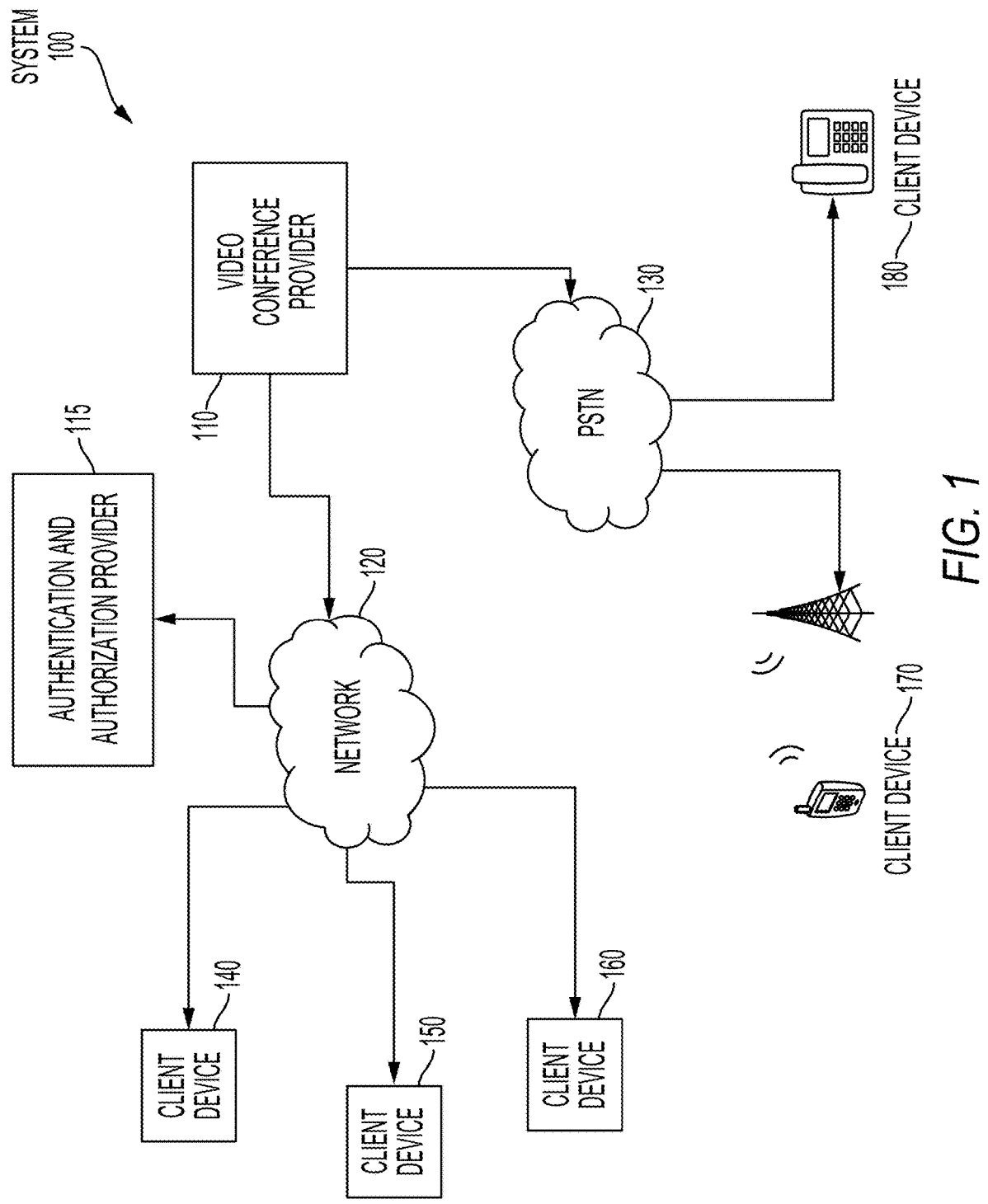
FIG. 1 shows an example system that provides videoconferencing functionality to various client devices, according to some aspects of the present disclosure.

Examples are described herein in the context of techniques for failover monitoring using dynamic traffic tagging. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application-and business-related constraints, and that these specific goals will vary from one implementation to another and from one developer to another.

Video conferencing is by now part of the fabric of our shared, online community, in both the home and the workplace. One reason for the increasing ubiquity of video conferencing is that it is known to be reliable. For example, video conference service providers may construct backend systems with high degrees of availability and fault tolerance, even in the face of "disasters," as design parameters. Such design considerations may result in users' confidence that video conferencing services will be dependable and always available.

One aspect of high availability and fault tolerance involves robust failover mechanisms. Failover mechanisms are a pillar of reliable systems that include, among other things, procedures, components, and instructions for ensuring that, upon failure of a server or network component, network traffic can be seamlessly routed to a substitute server or network component. The ideal failover mechanism generally results in no perceptible downtime to end users.

Failover mechanisms can involve a variety of approaches for disaster recovery. For example, active-active failover mechanisms involve fully-online systems or components that can immediately assume load upon failover, thus ensuring no interruption in service. In contrast, active-passive failover mechanisms can involve a primary system handling the workload and a secondary standby system that activates only when the primary system fails. Failover mechanisms can be manually or automatically activated.

Many variations and additions to these simple examples can be employed. For instance, some failover mechanisms may include an active-active-active configuration including three or more online instances of the systems or components, each instance handling a specified fraction of incoming network requests, in which each instance is capable of assuming the additional load of one of the other online systems, in addition to its own, in the event of a component failure.

A typical failover mechanism may involve servers or network components in different availability zones (AZs). An AZ refers generally to a network portion isolated from other AZs for fault tolerance and isolation. For example, AZs may be physically separated network infrastructure. One approach to failover between AZs may involve traffic redirection by reconfiguring the domain name system (DNS). However, this approach, while straightforward to implement, can be challenging to monitor, particularly in disaster scenarios in which time is of the essence.

For example, existing failover systems may lack a mechanism to ensure that the desired traffic redirection has worked as expected in near real-time. As a result, undetected service disruptions may occur, for instance, due to a coincidental failure in the failover AZ that is not detected until after well after the failover operation has been activated. Additionally, monitoring of the effectiveness of the failover AZ in handling the increased load due to the redirected traffic flow in near real-time may not be possible using existing systems. Without effective techniques for monitoring the success and effectiveness of failovers, a poor user experience may result for some users, potentially causing pecuniary losses and damage to the reputation of the service provider.

Techniques for failover monitoring using dynamic traffic tagging are thus provided for monitoring the success and effectiveness of failovers. In one example implementation, an application programming interface (API) can be provided for dynamically adding tags to client hypertext transfer protocol (HTTP) headers that include information about the current failover status. Another API can be provided for adding program code to HTTP servers for determining current failover status and for monitoring. The tags in received HTTP requests can be compared with the current failover status to determine the extent of the effectiveness of the failover operation. Information about the effectiveness of the failover operation can be sent to a monitoring system for collection, which can be then provided to system or network engineers for analysis and troubleshooting.

The following non-limiting example is provided to introduce certain concepts. In an example method, a computing device, such as a network management server, outputs failover information including a designation of the current failover network location. The failover information is received by a number of server devices located at disparate network locations. For instance, some server devices may be in a first AZ, while others are in a second AZ. The failover information may be included in a broadcast message sent using, for example, a messaging service.

The network management server receives, from a server device in the first AZ, a failover status message. The failover status message includes an indication that the server device received a request message that included the current failover location. For example, the request message may be an incoming HTTP request that includes a header that specifies the first AZ as the current failover location. The indication further specifies that the first AZ matches the current failover location, suggesting a nominal state of affairs.

Later, a disaster, such as a server or network component failure occurs, and a failover mechanism is activated, redirecting network traffic bound for the first AZ to the second AZ. The network management server now outputs additional failover information, this time including a designation of a the second, failover AZ as the current failover location, the additional failover information again received by the number of server devices at disparate network locations via, for example, a broadcast message received via subscribed topics or queues.

The network management server receives, from the server device at the first AZ, another failover status message. This time, however, the indication specifies that the server device received a second request message specifying the current failover location, but that the first AZ does not match the current failover location, which is now the second.

Thus, network traffic that should have been redirected to the second AZ by the failover mechanism has been received at the first AZ, indicating that the failover has failed at least to some extent. The network management server then outputs a failover failure notification, including information about the mismatch reported by the server device. Numerous such notifications in aggregate can indicate that the failover mechanism has failed or is not effective and cause network administrators to take corrective actions. Moreover, the notifications in aggregate can be consumed by data aggregation services and used for near real-time monitoring of failover operations using dashboards, visualizations, etc.

In response to the failover status message specifying that the first AZ did not match the current failover location, the second AZ, the network management server outputs a command to cause a corrective action. For example, the command may cause a configuration change at the first or second AZs or to the components implementing the failover mechanism. In another example, the command can cause resending of the additional failover information to, for example, cause certain components to reset, retry, update settings, or perform other operations whose failure may have contributed to the apparent failure.

The innovations of the present disclosure provide significant improvements in the technical field of disaster recovery during network administration. Failover systems can now include a mechanism to ensure that the desired traffic redirection has worked as expected in near real-time, minimizing the time that undetected service disruptions exist. Similarly, monitoring of the effectiveness of a failover in handling increased load due to redirected traffic flow in near real-time can reduce the time before mitigating actions are taken in the event of failure mechanism failures, further reducing potential service disruptions.

The innovations disclosed herein moreover improve the functioning of computer systems. Because notifications relating to failover reduced status or failures are event-driven and therefore generated in near real-time, the consumption of computing processing power and memory is reduced through less time operating in a redundant or reduced status. Similarly, because allocation of network administration resources can be done per current need, less excess usage of monitoring and mitigation services may be, resulting in streamlined communication between systems and reduced resource consumption. Resource consumption can be further reduced through unnecessary system checks and overall reduction in resources devoted to monitoring, since the innovations of the present disclosure involve lightweight modifications to HTTP clients and servers. The concomitant enhanced network traffic monitoring can be accompanied by an overall decrease in network traffic, reducing the load on servers and network components.

These illustrative examples are given to introduce the reader to the general subject matter discussed herein and the disclosure is not limited to these examples. The following sections describe various additional non-limiting examples of systems and methods for failover monitoring using dynamic traffic tagging.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
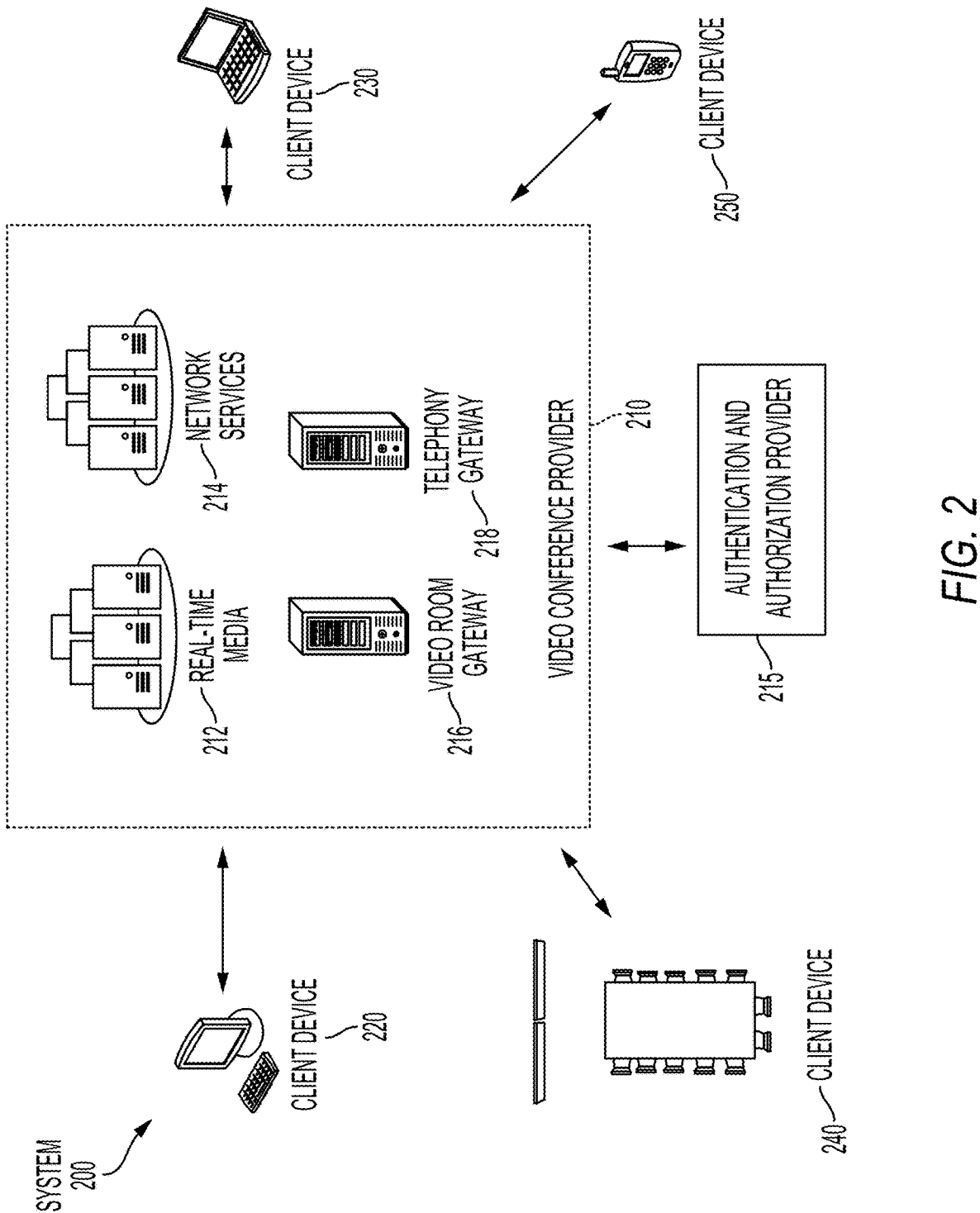
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Turning next to FIG. 3, FIG. 3 shows an example user interface 300 that may be used in some example systems configured for failover monitoring using dynamic traffic tagging. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
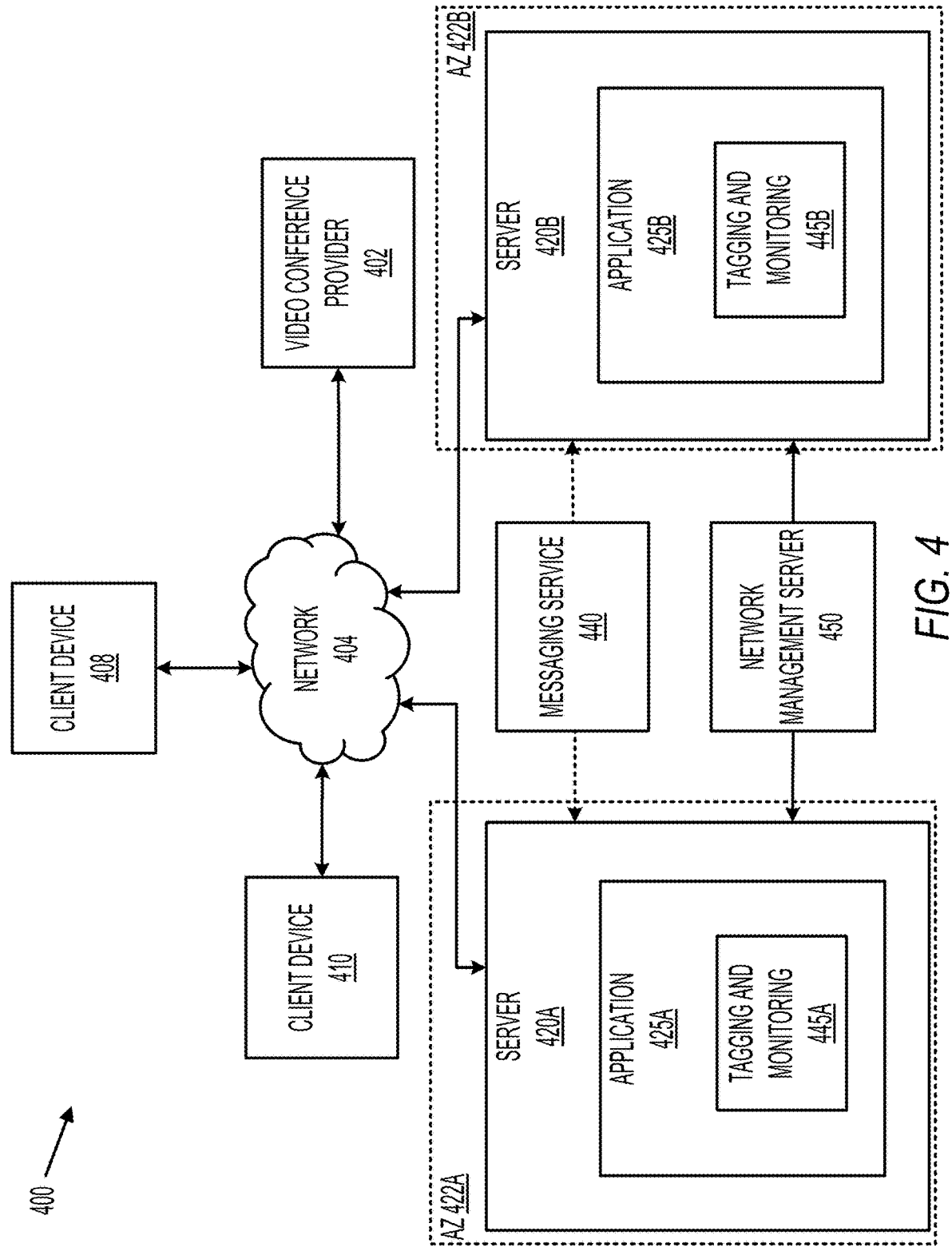
FIG. 4 shows an example of a system used for failover monitoring using dynamic traffic tagging, according to some aspects of the present disclosure.

Referring now to FIG. 4, FIG. 4 shows an example of a system 400 used for failover monitoring using dynamic traffic tagging. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 are used for configuring the system 400 for failover monitoring using dynamic traffic tagging as well as, for example, receiving information about failover statuses and providing visual presentations for use by network engineers. For instance, client devices 408, 410 can be used to configure and operate the network management server 450. Client devices 408, 410 may be any type of device capable of executing the appropriate client software for failover monitoring using dynamic traffic tagging. For example, the client devices 408, 410 may be laptops, desktops, smartphones, tablets, internet protocol (IP) phones, and so on.

System 400 includes a network management server 450 that includes components for coordination of the system 400 for failover monitoring using dynamic traffic tagging. Network management server 450 may, for instance, provide application programming interfaces (APIs) or user interfaces for configuration of the system 400, accessible by the client devices 408, 410. Based on its configuration, network management server 450 outputs commands to components such as a messaging service 440 or components of servers 420A and 420B, located in first and second availability zones (AZs) 422A, 422B, respectively.

System 400 includes server 420A in AZ 422A and server 420B in AZ 422B. An AZ is a network location that may be physically or logically isolated from failures in other AZs. Physical isolation can include physical redundancies (e.g., redundant power sources) or geographic separation while logical isolation can include network isolation (e.g., independent subnetworks). Physical or logical separation may have other functions or benefits such as enabling load balancing and traffic distribution across AZs, compliance with regional data regulations, and improved compartmentalization with respect to security requirements.

AZs are an example of a grouping of networked resources that is used to maximize network resilience and to ensure high availability of services. Other groupings may be suitable for use with the present application including include such as regions or other groupings which may include numerous AZs, data centers, server clusters, virtual private clouds, and so on.

In one example, AZs can be the subject of network failover management, in which a network, hardware, or application failure in one AZ results in a failover operation to another AZ. This mechanism, sometimes referred to as a disaster recovery mechanism, is designed to minimize any apparent downtime to end users. A successful failover operation is typically transparent to end users or other service consumers (e.g., other servers in a distributed architecture).

The dotted lines representing AZ 422A and AZ 422B in FIG. 4 schematically indicate isolated networks (e.g., AZ 422A and AZ 422B may be geographically disparate). While system 400 includes only two AZs 422A and 422B, the concepts disclosed herein apply to any number of servers in any number of AZs. AZs, for example, can include multiple servers. In some examples, servers are further grouped into server groups, an example of which will be described below with respect to FIGS. 5 and 6.

Configuration of highly-available systems is based on maximization of uptime, balanced against operational and economic considerations. For example, in an "active/active"

configuration all AZs are redundant to some extent and may be handling traffic simultaneously. This configuration is an example of one that maximizes availability while requiring load balancing and potentially higher costs. In contrast, an "active/passive" configuration involves a primary active AZ handling the workload and a secondary, passive AZ that is configured to assume load in the event of a failure in the active AZ. Moreover, the secondary AZ can be in varying states of readiness, which can affect the speed and effectiveness of a failover operation.

Servers 420A, 420B execute program code that is included in applications 425A, 425B that provide services to end users such as APIs, databases, web applications, and so on. In an example failover configuration, the servers 420A, 420B or the applications 425A, 425B executing thereon may include program code for effecting failover operations. For example, application 425A can receive information about a failover operation from AZ 422A to AZ 422B. Upon receipt of network traffic at AZ 422A, application 425A can redirect or resend the traffic to application 425B in AZ 422B. Failover redirection may similarly occur at the server level, server group level, or at the AZ level using, for example, a gateway or routing component.

In example system 400, the network management server 450 is configured to coordinate failover operations among AZs 422A and 422B. An example failover operation will be discussed to illustrate certain concepts. However, in some examples, the network management server 450 may, in addition, coordinate failover operations among a number of additional servers in disparate AZs. The concepts illustrated below generalize to a variety of server and AZ configurations, in addition to other network topologies. For example, in addition to AZs, other strategies for disaster recovery management can be used such as virtualization and containerization in which network resources may be co-located but isolated through virtualization and containerization technologies.

In example system 400, prior to the failover, the network management server 450 outputs failover information to the servers 420A, 420B located in AZ 422A and 422B, respectively. For example, the network management server 450 can output a command to cause the messaging service 440 to output a broadcast or multicast message including the failover information. A broadcast or multicast message is one that is output by the messaging service 440 and received by all or certain subscribers, respectively.

The messaging service 440, also known as a message broker or queue manager, is a software application that enables client applications to receive messages through subscriptions to topics or queues. The messaging service 440 likewise enables asynchronous communication, such that client applications can receive messages without a direct or continuous connection with the messaging service 440. In general, topics can be used in conjunction with subscriptions in which messages are broadcasted to multiple subscribers, whereas queues can be used when messages are directed to specific receivers. Either or both messaging paradigms can be used by subscribers (e.g., servers, applications, etc.) in conjunction with the network management server 450.

The broadcast failover information includes a designation of an AZ (or other network grouping) as the current failover location. For example, the failover information may include a JavaScript Object Notation (JSON) object that specifies the current failover location. In this simple example, the failover information is received by the servers 420A, 420B which may be subscribers to a topic relating to failover information. The failover information may be cached or otherwise persisted at the servers 420A, 420B.

Considering the example in which the first AZ 422A is the current failover location, the network management server 450 later receives a first failover status message from server 420A. The failover status message includes information about receipt of a request message at server 420A with information specifying the current failover location as the first AZ 422A. For instance, the request message may be an incoming Hypertext Transfer Protocol (HTTP) request directed to an API exposed by application 425A. In this example, the current failover location persisted by server 420A matches the current failover location contained in the received request. The received request is thus received where it is supposed to be received: at the first AZ 422A.

The comparison between the current failover location persisted by 420A and the current failover location contained in the received request message is performed by a tagging and monitoring component 445A. In some examples, the tagging and monitoring component 445A is program code executing as part of application 425A. For example, tagging and monitoring component 445A may be program code included using a program code library exposing an API for use in the component of application 425A that receives request messages. For instance, if the application 425A is a web application written in the Java programming language, the tagging and monitoring component 445A may include components authored using a library included during the build of application 425A using a specification in a Project Object Model (POM) file.

In examples in which the application 425A exposes a web-based API that can receive HTTP request messages, then the tagging and monitoring component 445A can be included in the program code for processing the incoming HTTP request messages. In some examples, the program code for processing the incoming HTTP request messages may include an API for adding middleware, sometimes referred to as interceptors, filters, or handlers, that can perform specific actions on incoming or outgoing HTTP messages before passing them to the next component in the request processing pipeline. The program code for the tagging and monitoring component 445A program code can be added to such middleware to cause the comparison between the current failover location specified in incoming messages with the locally persisted current failover location.

A second illustrative example follows a failover operation. For example, an application outage may occur in a component of server 420A, another server, or a network component in the first AZ 422A. The network management server 450 outputs a command to cause the messaging service 440 to output a broadcast or multicast message indicating that the current failover location is now the second AZ 422B. The broadcast message is received by all servers 420A and 420B and is again cached or otherwise persisted at the servers 420A, 420B.

The received broadcast message can cause the servers 420A, 420B to execute a failover operation. For example, the broadcast message may cause a component of server 420A to redirect received network traffic to server 420B. The component may be, for example, a load balancer, a reverse proxy, or a firewall.

In this example, however, when the network management server 450 later receives a failover status message from server 420A, the current failover location persisted by 420A fails to match the current failover location contained in the received request. The received request has thus not been received at the current failover location, the second AZ

422B. The comparison is again performed by tagging and monitoring component 445A included in application 425A or otherwise incorporated into server 420A. Such a mismatch may occur if the failover mechanism is not working as designed. This may happen, for instance, if a reconfiguration of the load balancer failed to save properly upon notification of a failover. Requests that should be redirected to server 420B are thus still received by application 425A at server 420A. Other example causes of failed or partially failed failover operations include network connectivity issues, computing resource exhaustion, or software bugs.

As a result of the detected mismatch, the network management server 450 can output a failover failure notification, including information about the detected mismatch. The failover failure notification can be used for monitoring the overall status of failover operations, populating dashboards or other visualizations, or notifying network engineers, particularly when such notifications are received in aggregate.

Moreover, in response to the mismatch, the network management server 450 can output commands corresponding to a failover corrective action, chosen to cause a correction to the failover operation. For example, the network management server 450 may output a command to cause an update to the configuration settings of failover components in the server 420A or to the messaging service 440 to re-send the broadcast message including the updated failover information.

In a third illustrative example, network traffic is properly redirected from server 420A to server 420B. The network management server 450 receives a failover status message from server 420B indicating that the current failover location persisted by 420B matches the current failover location contained in the received request. The inclusion of the current failover information in the received messages can be performed by tagging and monitoring components 445A and 445B located in servers 420A and 420B, respectively. In this case, the current failover information can be added to the request messages during a failover operation in the event that it is not already present or updated in the case when it is inaccurate or out of date. This operation is generally referred to as tagging of the request messages.

For example, server 420A may be executing an application 425A such as a web application or other application that can receive request messages. The application 425A may be configured to redirect network traffic to another failover location in the event a failover operation occurred. The application 425A may include an extendable web server or other extendable application that can receive HTTP messages. Such messages, when they are received, can be forwarded in the event of a failover. In that case, the messages can likewise be tagged with the current failover information before they are forwarded. For example, the current failover information can be added to a query parameter, header, cookie, message body, etc.

Current failover information can similarly be included in request messages sent by a network client application. For example, some request messages may be sent by HTTP clients external to the servers 420A and 420B (not shown). The applications executing such clients can also receive the current failover information via broadcast message or other means and can thus be tagged with the current failover information, just as requests are tagged in servers 420A and 420B. The network client applications can include program code using similar extensible mechanisms to those described above to intercept outgoing network messages and append current failover information to them.

Figure 5:
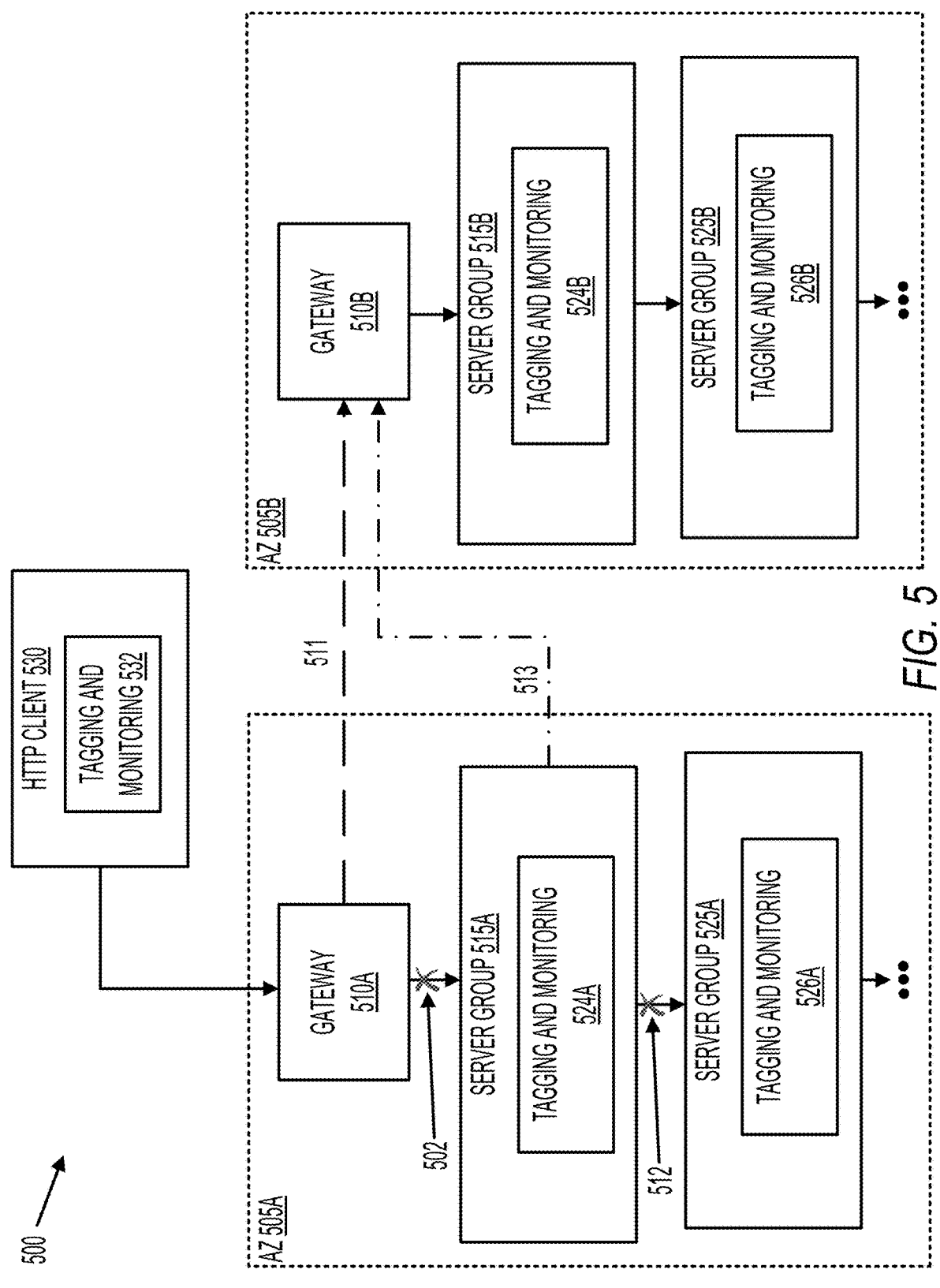
FIG. 5 shows another example of a system used during failover monitoring using dynamic traffic tagging, according to some aspects of the present disclosure.

Turning next to FIG. 5, FIG. 5 shows another example of a system 500 used during failover monitoring using dynamic traffic tagging. In particular, system 500 illustrates failover operations 502, 512 in a system 500 including additional components such as gateways and server groups. The failover operations 502, 512 may be triggered by a hardware malfunction, network malfunction, power loss, cooling loss, or software bug, among various other possibilities. The failover operations 502, 512 may be caused manually or automatically by network management server 450.

System 500 includes two AZs, 505A and 505B. The AZs 505A, 505B each include a gateway 510A, 510B. In some examples, the gateway 510A receives all incoming request messages to a particular AZ 505A and routes the messages to the appropriate server group 515A or server 520A. The gateways 510A, 510B in AZs 505A, 505B, respectively, can be configured to reroute traffic 511 from one AZ 505A to another AZ 505B when the failover operation 502 is initiated. The gateways 510A, 510B can perform additional functions including security, filtering, and load balancing, among other functions.

In one example, the failover operation 502 may be effected through reconfiguration of the load balancing components of gateways 510A, 510B. In another example, the Domain Name System (DNS) can be reconfigured to reroute traffic in accordance with the failover operation 502. DNS reconfiguration may involve updating the DNS record to point a server group or servers domain name to the IP address or addresses of the failover AZ 505B instead of the primary AZ 505B. The DNS configuration may be updated using the gateway 510A or other specialized component (not shown). In these and other implementations of the failover mechanism 502, the traffic is redirected 511 from gateway 505A to gateway 505B and then routed by gateway 505B as described above. In some examples, the gateways 510A, 510B can be configured with tagging and monitoring components that can be used to perform the monitoring, notifications, and corrective actions of the present disclosure.

The AZs 505A, 505B each include a server groups 515A, 515B and 525A, 525B. In this context, the term "server group" refers generally to a collection of related services that may be logically grouped together for the purposes of routing and disaster recovery. The server groups 515A, 515B, 525A, 525B may each include one or more servers that are topologically related using a subnetwork, IP addresses, DNS configuration, and so on. For clarity, the server groups 515A, 515B, 525A, 525B are shown without included servers, applications, etc. However, server groups 515A, 515B, 525A, 525B can include numerous servers. Likewise, AZs 505A, 505B can include numerous server groups.

In system 500, the server group pairs 515A, 525A and 515B, 525B are configured for internal routing within each respective AZ 505A, 505B. Considering AZ 505A for clarity, incoming network traffic arrives at gateway 505A and is routed to server group 515A. Server group 525B, however, is not connected to server group 515A and instead uses an internal routing scheme in which network traffic directed to server group 525A is received at gateway 505A, routed to server group 515A, and then routed to server group 525A by a component of server group 515A.

Internal routing schemes may be used in tiered architectures for enhanced security isolation of downstream components, fine-grained control of routing, enables load balancing among server groups, among other useful properties. In some examples, the server group 515A provides a user-facing service such as a web application while lower tier server groups (e.g., server group 525A) implement backend services, databases, etc. A hierarchy of server groups is shown in system 500 but more complex internal routing schemes are possible. For example, a particular server group could internally route to numerous other server groups.

In some examples, because the failover operation 502 redirects network traffic before its receipt at server group 515A, the tagging and monitoring functions described above with respect to FIG. 4 cannot be provided by tagging and monitoring component 524A (although, as mentioned above, some gateways 505A, 505B can be configured with comparable tagging and monitoring components). Failover operation 512, however, may be initiated when server group 525A experiences a malfunction or failure. The failover operation 512 may cause internally routed network traffic to be redirected to gateway 510B to be routed normally in AZ 505B.

In this example, the tagging and monitoring component 524A can perform the monitoring functions such as the comparison between the current failover location persisted at server group 515A and the current failover location contained in a received request message, as described in the description accompanying tagging and monitoring component 445A in FIG. 4 above. Likewise, tagging and monitoring component 524A can tag outgoing or redirected network traffic with current failover information. In some examples, the redirection of traffic can be performed by the tagging and monitoring component 524A instead of or in addition to the redirection operations performed by other server or server group 515A components.

During normal operations, server group 525A can internally route network traffic to additional server groups indicated with three black dots. In the event of a failover operation occurring prior to one of these downstream server groups, the processes described with respect to failover operation 512 could proceed similarly for server group 525A and tagging and monitoring component 526A. Likewise, the processes described with respect to failover operation 512 could proceed similarly for the components in AZ 505B including server group 515B and tagging and monitoring component 524B; and server group 525B and tagging and monitoring component 526B.

System 500 also includes HTTP client 530 which includes tagging and monitoring component 532. The HTTP client 530 may be a standalone client executing requests against an application in AZ 505A or it may included in an application (not shown) external to AZ 505A. Current failover information can be included in HTTP messages sent by the HTTP client 530 by tagging and monitoring component 532. The clients or external applications operating HTTP client 530 can receive the current failover information via broadcast message, via query of a persistent store, or other means. Tagging and monitoring component 532 can then take outgoing HTTP requests with the current failover information. For example, the current failover information may be included in HTTP headers, cookies, parameters, message bodies, and so on. The tagging and monitoring component 532 can be added to HTTP client 530 using extensible mechanisms similar to those described above to intercept outgoing network messages and append current failover information to them. For instance, the HTTP client 530 may provide an interceptor, filter, or handler component that can be augmented to include the functions of tagging and monitoring component 532.

Figure 6:
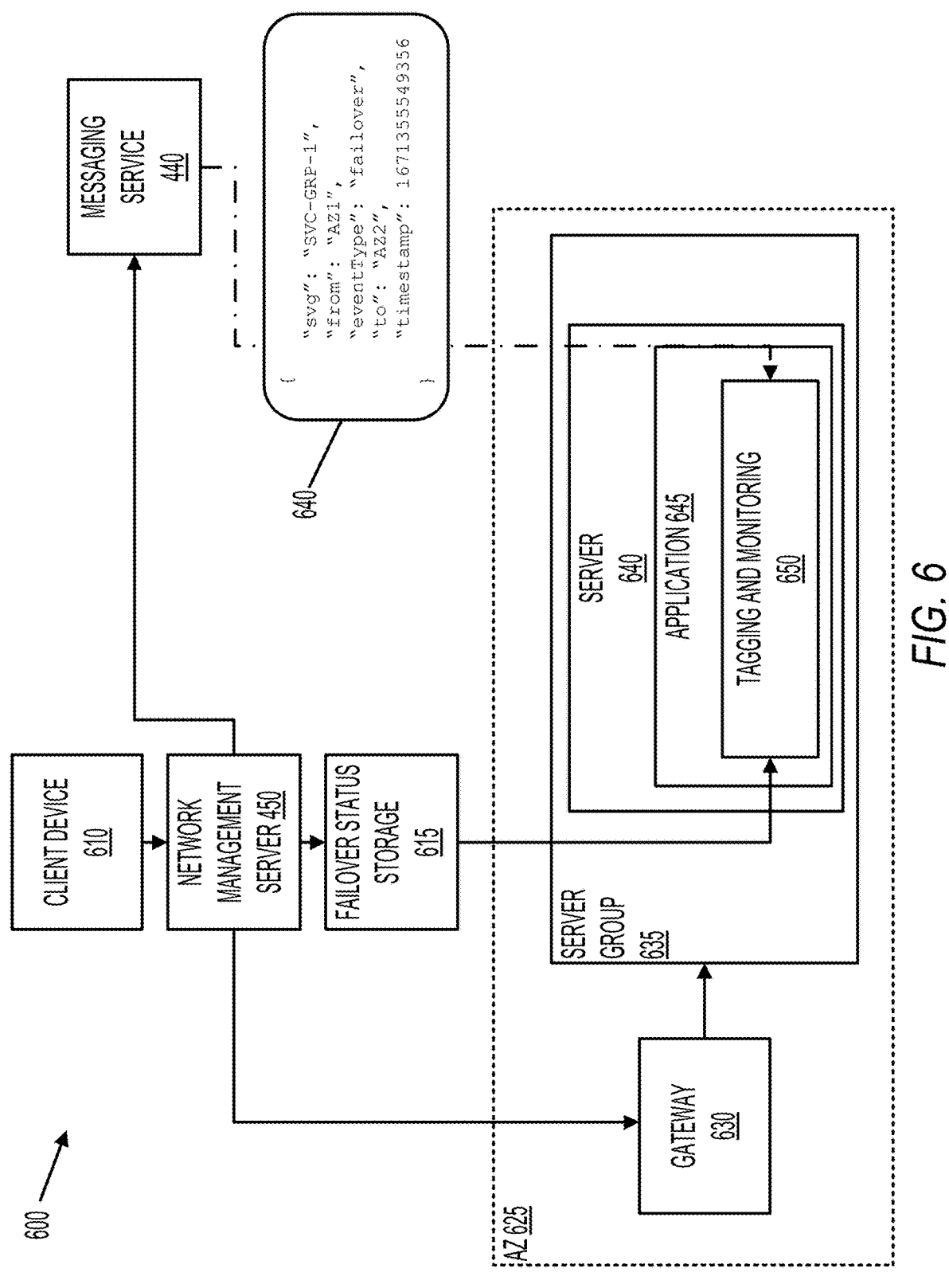
FIG. 6 shows yet another example of a system used during failover monitoring using dynamic traffic tagging, according to some aspects of the present disclosure.

Turning next to FIG. 6, FIG. 6 shows yet another example of a system 600 used during failover monitoring using dynamic traffic tagging. System 600 includes network management server 450, shown in FIG. 4 above and described in the accompanying description. Network management server 450 may detect a condition or malfunction that warrants a failover. For example, a hardware malfunction, network malfunction, power loss, cooling loss, or software bug, among other conditions, may be designated as conditions that warrant a failover operation. The condition may be likewise manually identified by, for example, a network engineer. The failover operation may then be initiated automatically by network management server 450 or manually by a network engineer issuing commands to network management service 450 using a client device 610.

Among other things, the failover operation includes the identification of and designation of a failover network location. For example, during normal operations in a network with an active/active configuration, network traffic may be directed to each of two AZs according to a load balancing scheme. Upon failover, all network traffic may be directed to one of the AZs. In an example network with an active/standby configuration, all network traffic may be initially directed to a first AZ and then directed to a second AZ upon failover.

Upon initiation of a failover operation, the network management server 450 can update the failover status at a failover status storage component 615. The failover status storage component 615 may be any suitable persistent store for failover status information. In some examples, the failover status storage component 615 may be an in-memory storage application such as in in-memory cache that is backed up with persistent storage to disk. In some other examples, the failover status storage component 615 may be local hard disk, a solid state drive, network drive, or cloud storage location such as an object-based cloud storage location as provided by a cloud storage provider.

System 600 includes AZ 625 which receives network traffic via gateway 630. AZ 625 includes server group 635. Server group 635 includes server 640. Server 640 is executing application 645 which includes tagging and monitoring component 650. For clarity, system 600 includes single examples of these components but other examples may include a number of AZs, server groups, servers, applications, and so on, arranged for a variety of network topologies and application configurations.

The network management server 450 may be communicatively coupled with gateway 605 that provides routing, load balancing, security, and other services to AZ 625. Upon initiation of a failover operation, the network management server 450 may update the configuration of the gateway 630 to redirect traffic to the new failover location. For example, in an example network with an active/standby configuration, the gateway 630 configuration can be configured to direct all network traffic to a second AZ. This can be caused by rerouting network traffic directly, changing DNS settings, or other suitable means.

Network management server can likewise provide failover information to gateway 630 as well as server or application components such as tagging and monitoring component 650 using a messaging service 440. Messaging service 440 may be configured with one or more topics. Each topic can be subscribed to by one or more consumers. For example, the tagging and monitoring components . . . may subscribe to a broadcast topic which will send each broadcast message 640 to all subscribers. The topic may have a name such as "abc123_srv_grp_aaa_event." In this example, the topic name is descriptively chosen to correspond to a particular network or cluster with the hexadecimal identifier "abc123." The broadcast-type topic is intended for subscription by server groups ("srv_grp") that are configured in the active/active/active failover configuration.

Upon receipt of the updated failover information, messaging service 440 can output broadcast message 640 to the appropriate topic or queue. In the example shown, the broadcast message 640 is a JSON object including failover information such as the server group having the malfunction ("svg"), the AZ containing the malfunctioning server group ("from"), the type of event ("eventType"), the new, target AZ for traffic redirection ("to"), and a timestamp ("timestamp"). Other message formats and contents may be similarly used.

Receipt of broadcast message 640 by tagging and monitoring component 650 can cause local storage of the updated failover location using a cache or other persistent store. The broadcast message 640 may update the current failover location as determined during initialization or during periodic updates. Upon writing or updating of the current failover location, incoming tagged network traffic can be compared with the stored current failover location and outgoing traffic can be tagged with the stored current failover location. In some examples, the tagging and monitoring component 650 can itself perform the failover operation by tagging and then forwarding received network traffic to the stored current failover location.

Referring now to FIG. 7, FIG. 7 shows a flowchart of an example method 700 for failover monitoring using dynamic traffic tagging. The description of the method 700 in FIG. 7 will be made with reference to FIGS. 4-6, however any suitable system according to this disclosure may be used, such as the example systems 100 and 200, shown in FIGS. 1 and 2. It should be appreciated that method 700 provides a particular method for failover monitoring using dynamic traffic tagging. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of the network management server 450 but other configurations are possible. One of ordinary skill in the art would recognize many variations, modifications, and alternatives.

The method 700 may include block 710. At block 710, the network management server 450 outputs first failover information, including a first designation of a first network location as a current failover location, in which the first failover information is received by one or more server devices. The first failover information includes an indication of the current failover location. For example, the broadcast message 640 shown in FIG. 6 and described in the accompanying description is an example of the form the first failover information may take. In that example, the broadcast message 640 is received by the various subscribers to the appropriate message queue, including gateways, server groups, servers, and applications that may be affected by a failover operation.

In some examples, the first failover information may be received by the first server device during an initialization process. For example, the first server device, upon starting or restarting, may execute program code that queries the network management server 450 or other component such as the failover status storage component 615. The first server device may, for example, send an HTTP request message to an API hosted by the network management server 450. Alternatively, instead of during or subsequent to initialization, the first failover information can be received by the first server device in response to periodic queries. The first server device may, for example, query the API hosted by the network management server 450 after a predetermined period of time has elapsed on a recurring basis. Because disaster recovery is ideally transparent to end users, the predetermined period of time may be selected to minimize the window of time in which out of date failover information is known. For example, the predetermined period of time may be one second or less.

At block 720, the network management server 450 receives, from a first server device of the one or more server devices at the first network location, a first failover status message that includes a first indication that the first server device received a first request message including the current failover location and a second indication that the first network location matches the current failover location. For example, during normal operations during which no failover has occurred, the first server device may receive an HTTP request message that is tagged with the current failover location. The current failover location may be included in, for instance, an HTTP header of the incoming HTTP message. The incoming HTTP message may have been thus tagged by another server or an HTTP client.

At block 730, the network management server 450 outputs second failover information including a second designation of a second network location as the current failover location, in which the second failover information is received by the one or more server devices. For example, in response to the detection of a failure and subsequent initiation of a failover, the current failover location shifts to another AZ. The network management server 450 can output a command to cause the messaging service 440 shown in FIG. 4 and described in the accompanying description to output a broadcast message 640 containing the updated current failover location. For instance, the current failover location may be updated from AZ 505A to AZ 505B in FIG. 5.

At block 740, the network management server 450 receives, from the first server device at the first network location, a second failover status message, including a third indication that the first server device received a second request message including the current failover location and a fourth indication that the first network location does not match the current failover location. For example, consider the failover operation 512 and associated reroute 513 shown in FIG. 5 and described in the accompanying description. While the current failover location has been updated to AZ 505B, the second request message nevertheless is received at a server or application of server group 515A, which may be an indication that the failover mechanism is not working as expected. For example, this may occur when the server group 515A includes a rerouting mechanism that is failing to reroute as expected or DNS changes for rerouting traffic are slow to propagate across the network.

In this case, the tagging and monitoring component 524A can receive the second request message that is tagged with the current failover location (AZ 550B) and compare it with its own network location (AZ 505A). Upon the determination that the two locations do not match, the tagging and monitoring component 524A can send a failover status message to the network management server 450 indicating that a mismatch is detected, which may imply that the failover operation 512 has failed or otherwise provide information relating to the failover operation 512.

At block 750, the network management server 450 outputs a failover failure notification including the fourth indication that the first network location does not match the current failover location. For example, upon receipt of the information about the detected mismatch in block 740, the network management server 450 can output information about the mismatch so that network engineers or other troubleshooters can take corrective action.

In an operational setting, the network management server 450 may receive large quantities of failover status messages from applications, servers, server groups, and so on. The network management server 450 may be configured to output aggregate failover failure notification indicating the locations, durations, magnitudes, and trends with respect to detected failover failures. The aggregate failover failure information can be used to generate visualizations, charts, reports, etc. that may be used for management, maintenance, and troubleshooting of large, complex networks.

At block 760, in response to the first network location not matching the current failover location, the network management server 450 outputs a failover corrective action, the failover corrective action including a command to cause the first network location to match the current failover location. For example, the network management server 450 can output instructions to reinitiate the failover operations or a reconfiguration thereof. For instance, the failover operation can be retried using a different AZ or other parameter. Similarly, the network management server 450 can output instructions to adjust network configurations, such as modifying firewall rules or updating load balancer settings, that may be causing apparent failover failures or reductions in effectiveness. The network management server 450 can output commands to cause troubleshooting scripts or other program code to execute that may correct certain anticipated issues. For example, scripts may reset network interfaces or execute network diagnostic programs.

In some examples, the network management server 450 can output commands to trigger alerts, alarms, warnings, or notifications directed to network administrators. The alerts may include diagnostic reports and other information about details of the apparent failover failures or reductions in effectiveness.

Referring now to FIG. 8, FIG. 8 shows a flowchart of an example method 800 for failover monitoring using dynamic traffic tagging. The description of the method 800 in FIG. 8 will be made with reference to FIGS. 4-6, however any suitable system according to this disclosure may be used, such as the example systems 100 and 200, shown in FIGS. 1 and 2. It should be appreciated that method 800 provides a particular method for failover monitoring using dynamic traffic tagging. Other sequences of operations may also be performed according to alternative examples. For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications. Further, the operations described in method 800 may be performed by different devices. For example, the description is given from the perspective of a server device such as server 420A or 640 but other configurations are possible. One of ordinary skill in the art would recognize many variations, modifications, and alternatives.

The method 800 may include block 810. At block 810, a server device at a first network location receives a request message that does not include the current failover location. For example, a failover operation such as the failover operation 512 described above with respect to FIG. 5 may have occurred. The failover operation 512 may specify that traffic should be redirected to a second network location, such as another AZ. In this case, a gateway or other similar routing component has received network traffic and internally routed the network traffic to a server group, such as server group 525A of FIG. 5. The network traffic may be received by a tagging and monitoring component such as tagging and monitoring component 526A of FIG. 5.

At block 820, the server device determines that the first network location does not match the current failover location, the second network location. In this example, the mismatch occurs because the incoming traffic is not tagged. This may occur when, for example, the network traffic was not tagged by the sending client. In another example, the mismatch may occur because the tag of the incoming network traffic does not match the current failover location. Both mismatches may be reported to the network management server 450 of FIG. 4 (as described in detail in the accompanying description) which can aggregate both types of mismatches for troubleshooting purposes.

At block 830, the server device updates the request message to include the current failover location. For example, the tagging and monitoring component may be a network application extension generated using an application programming interface (API) included in a suitable software development kit (SDK). The current failover location may be received by the tagging and monitoring component as by, for example, receipt of a broadcast message 640 as described in the description accompanying FIG. 6.

For instance, a network application that is a Java web application may be extended with modules that can intercept and perform operations on incoming and outgoing HTTP messages. The modules may be authored using an API provided by the publishers of an SDK for this purpose. The SDK may include API documentation, example code, code templates, build tools, tests, and so on. The API can be made available to the network application extension using a suitable build configuration file such as a POM file. This description relating to Java web application development is merely an example and comparable components, APIs, SDKs, extensions, and so on are available for a variety of platforms and programming languages.

The request message can be updated to include the current failover location. For example, if the request message is an HTTP message, the current failover location can be added to a query parameter, header, cookie, message body, etc. In one example, the failover location is added ton HTTP header such illustrated by: "Failover-Location: AZ2." In another example, a query parameter can be appended to the redirection Uniform Resource Locator (URL), such as "?failover-location=AZ2."

At block 840, the server device outputs the request message to cause the request message to be forwarded to the current failover location. For example, the tagging and monitoring component can forward the tagged request message to the current failover location, which is the second network location in this example. In some examples, the tagging and monitoring component can perform the forwarding. In other examples, the forwarding is performed by other components of the containing application or server.

At block 850, a server device at the second network location receives the request message. The request message may be forwarded or redirected from the previous failover location such as another AZ.

At block 860, the network management server 450 receives, from a server device at a second network location, a failover status message, including an including an indication that the server device at the second network location received the request message and that the second network location matches the current failover location. In contrast to the comparison at block 820, information about the successful match can be sent to the network management server 450 for aggregation, now as an indication of a successful failover operation.

Figure 9:
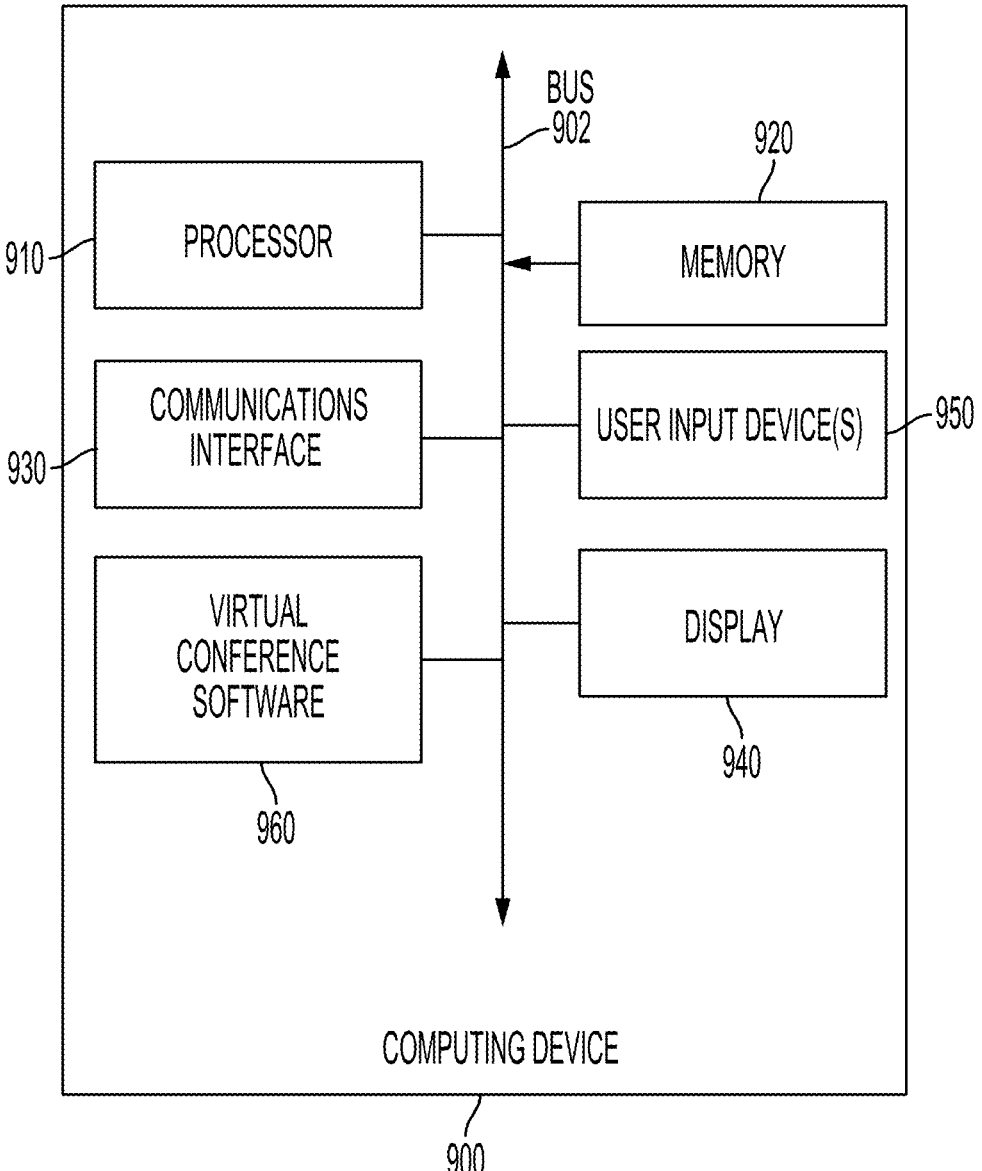
FIG. 9 shows an example computing device suitable for use in example systems or methods for providing failover monitoring using dynamic traffic tagging, according to some aspects of the present disclosure.

Referring now to FIG. 9, FIG. 9 shows an example computing device 900 suitable for use in example systems or methods for providing failover monitoring using dynamic traffic tagging according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for failover monitoring using dynamic traffic tagging according to different examples, such as part or all of the example methods 700 and 800 described above with respect to FIGS. 7 and 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: outputting first failover information, the first failover information including a first designation of a first network location as a current failover location, wherein the first failover information is received by one or more server devices; receiving, from a first server device of the one or more server devices at the first network location, a first failover status message, comprising: a first indication that the first server device received a first request message, the first request message including the current failover location; and a second indication that the first network location matches the current failover location; outputting second failover information, the second failover information including a second designation of a second network location as the current failover location, wherein the second failover information is received by the one or more server devices; receiving, from the first server device at the first network location, a second failover status message, comprising: a third indication that the first server device received a second request message, the second request message including the current failover location; and a fourth indication that the first network location does not match the current failover location; outputting a failover failure notification, the failover failure notification including the fourth indication that the first network location does not match the current failover location; and responsive to the first network location not matching the current failover location, outputting a failover corrective action, the failover corrective action including a command to cause the first network location to match the current failover location.

Example 2 is the method of example(s) 1, further comprising: receiving, from a second server device of the one or more server devices at the second network location, a third failover status message, comprising: a fifth indication that the second server device received a third request message, the third request message including the current failover location; and a sixth indication that the second network location matches the current failover location; and wherein the current failover location is added to the third request message by a fourth server device of the one or more server devices at the first network location.

Example 3 is the method of example(s) 2, wherein adding the current failover location to the third request message by the fourth server device at the first network location comprises: receiving the third request message; determining that the first network location does not match the current failover location; updating the third request message to include the current failover location; and outputting the third request message to cause the third request message to be forwarded to the second network location.

Example 4 is the method of example(s) 3, wherein, upon receiving the third request message by the fourth server device at the first network location, the third request message does not include the current failover location.

Example 5 is the method of example(s) 2, wherein: the fourth server device at the first network location is executing a network application; the current failover location is added to the third request message by an extension of the network application; and the fifth and sixth indications are generated by the extension of the network application.

Example 6 is the method of example(s) 1, wherein the current failover location is included in the first and second request messages by a network client application.

Example 7 is the method of example(s) 1, wherein the first request message is a first Hypertext Transfer Protocol (HTTP) request message and the second request message is a second HTTP request message.

Example 8 is the method of example(s) 7, wherein the current failover location is included in an HTTP header of the first and second HTTP request messages.

Example 9 is the method of example(s) 7, wherein the current failover location is included in a body of the first and second HTTP request messages and the current failover location is included in a JavaScript Object Notation (JSON) object.

Example 10 is the method of example(s) 1, wherein the first failover information is received by the first server device during an initialization process and in response to a query.

Example 11 is the method of example(s) 1, wherein the first failover information is received by the first server device periodically in response to periodic queries.

Example 12 is the method of example(s) 1, wherein: the first failover information and the second failover information are broadcast messages; and the first server device receives the first failover information and the second failover information in response a subscription to a message queue.

Example 13 is the method of example(s) 1, wherein the command to cause the first network location to match the current failover location includes instructions for updating one or more configuration settings.

Example 14 is the method of example(s) 1, wherein the command to cause the first network location to match the current failover location includes instructions to resend the second failover information.

Example 15 is a non-transitory computer-readable medium storing instructions that, when executed by one or more processors, cause the one or more processors to perform operations including: outputting first failover information, the first failover information including a first designation of a first network location as a current failover location, wherein the first failover information is received by one or more server devices; receiving, from a first server device of the one or more server devices at the first network location, a first failover status message, comprising: a first indication that the first server device received a first request message, the first request message including the current failover location; and a second indication that the first network location matches the current failover location; outputting second failover information, the second failover information including a second designation of a second network location as the current failover location, wherein the second failover information is received by the one or more server devices; receiving, from the first server device at the first network location, a second failover status message, comprising: a third indication that the first server device received a second request message, the second request message including the current failover location; and a fourth indication that the first network location does not match the current failover location; outputting a failover failure notification, the failover failure notification including the fourth indication that the first network location does not match the current failover location; and responsive to the first network location not matching the current failover location, outputting a failover corrective action, the failover corrective action including a command to cause the first network location to match the current failover location.

Example 16 is the non-transitory computer-readable medium of example(s) 15, further comprising instructions to cause the one or more processors to perform the operations: receiving, from a second server device of the one or more server devices at the second network location, a third failover status message, comprising: a fifth indication that the second server device received a third request message, the third request message including the current failover location; and a sixth indication that the second network location matches the current failover location; and wherein the current failover location is added to the third request message by a network application executing on a fourth server device of the one or more server devices at the first network location.

Example 17 is the non-transitory computer-readable medium of example(s) 16, wherein the network application includes an extension generated using a software development kit (SDK).

Example 18 is a system comprising: one or more processors; and one or more computer-readable storage media storing instructions which, when executed by the one or more processors, cause the one or more processors to perform operations including: outputting first failover information, the first failover information including a first designation of a first network location as a current failover location, wherein the first failover information is received by one or more server devices; receiving, from a first server device of the one or more server devices at the first network location, a first failover status message, comprising: a first indication that the first server device received a first request message, the first request message including the current failover location; and a second indication that the first network location matches the current failover location; outputting second failover information, the second failover information including a second designation of a second network location as the current failover location, wherein the second failover information is received by the one or more server devices; receiving, from the first server device at the first network location, a second failover status message, comprising: a third indication that the first server device received a second request message, the second request message including the current failover location; and a fourth indication that the first network location does not match the current failover location; outputting a failover failure notification, the failover failure notification including the fourth indication that the first network location does not match the current failover location; and responsive to the first network location not matching the current failover location, outputting a failover corrective action, the failover corrective action including a command to cause the first network location to match the current failover location.

Example 19 is the system of example(s) 18, further comprising instructions to cause the one or more processors to perform the operations: receiving, from a second server device of the one or more server devices at the second network location, a third failover status message, comprising: a fifth indication that the second server device received a third request message, the third request message including the current failover location; and a sixth indication that the second network location matches the current failover location; and wherein the current failover location is added to the third request message by a network application extension executing on a fourth server of the one or more server devices at the first network location.

Example 20 is the system of example(s) 19, wherein: the network application extension is generated using an application programming interface (API) included in a software development kit (SDK); and a build configuration file causes the API to be included in the network application extension. 5

That which is claimed is:

1. A method, comprising:

outputting first failover information, the first failover information including a first designation of a first network location as a current failover location, wherein the first failover information is received by one or more server devices; 10 receiving, from a first server device of the one or more server devices at the first network location, a first failover status message, comprising: 15 a first indication that the first server device received a first request message, the first request message including the current failover location; and a second indication that the first network location matches the current failover location; 20 outputting second failover information, the second failover information including a second designation of a second network location as the current failover location, wherein the second failover information is received by the one or more server devices; 25 receiving, from the first server device at the first network location, a second failover status message, comprising:

a third indication that the first server device received a second request message, the second request message including the current failover location; and 30 a fourth indication that the first network location does not match the current failover location; 35 outputting a failover failure notification, the failover failure notification including the fourth indication that the first network location does not match the current failover location; and responsive to the first network location not matching the current failover location, outputting a failover corrective action, the failover corrective action including a command to cause the first network location to match the current failover location. 40

2. The method of claim 1, further comprising: 45 receiving, from a second server device of the one or more server devices at the second network location, a third failover status message, comprising:

a fifth indication that the second server device received a third request message, the third request message including the current failover location; and 50 a sixth indication that the second network location matches the current failover location; and wherein the current failover location is added to the third request message by a fourth server device of the one or more server devices at the first network location. 55

3. The method of claim 2, wherein adding the current failover location to the third request message by the fourth server device at the first network location comprises:

receiving the third request message; 60 determining that the first network location does not match the current failover location;

updating the third request message to include the current failover location; and outputting the third request message to cause the third request message to be forwarded to the second network location. 65

4. The method of claim 3, wherein, upon receiving the third request message by the fourth server device at the first network location, the third request message does not include the current failover location.

5. The method of claim 2, wherein:

the fourth server device at the first network location is executing a network application;

the current failover location is added to the third request message by an extension of the network application; and the fifth and sixth indications are generated by the extension of the network application.

6. The method of claim 1, wherein the current failover location is included in the first and second request messages by a network client application.

7. The method of claim 1, wherein the first request message is a first Hypertext Transfer Protocol (HTTP) request message and the second request message is a second HTTP request message.

8. The method of claim 7, wherein the current failover location is included in an HTTP header of the first and second HTTP request messages.

9. The method of claim 7, wherein the current failover location is included in a body of the first and second HTTP request messages and the current failover location is included in a JavaScript Object Notation (JSON) object.

10. The method of claim 1, wherein the first failover information is received by the first server device during an initialization process and in response to a query.

11. The method of claim 1, wherein the first failover information is received by the first server device periodically in response to periodic queries.

12. The method of claim 1, wherein:

the first failover information and the second failover information are broadcast messages; and the first server device receives the first failover information and the second failover information in response a subscription to a message queue.

13. The method of claim 1, wherein the command to cause the first network location to match the current failover location includes instructions for updating one or more configuration settings.

14. The method of claim 1, wherein the command to cause the first network location to match the current failover location includes instructions to resend the second failover information.

15. A non-transitory computer-readable medium storing instructions that, when executed by one or more processors, cause the one or more processors to perform operations including:

outputting first failover information, the first failover information including a first designation of a first network location as a current failover location, wherein the first failover information is received by one or more server devices;

receiving, from a first server device of the one or more server devices at the first network location, a first failover status message, comprising:

a first indication that the first server device received a first request message, the first request message including the current failover location; and a second indication that the first network location matches the current failover location;

outputting second failover information, the second failover information including a second designation of a second network location as the current failover location, wherein the second failover information is received by the one or more server devices;

receiving, from the first server device at the first network location, a second failover status message, comprising:

a third indication that the first server device received a second request message, the second request message including the current failover location; and a fourth indication that the first network location does not match the current failover location;

outputting a failover failure notification, the failover failure notification including the fourth indication that the first network location does not match the current failover location; and responsive to the first network location not matching the current failover location, outputting a failover corrective action, the failover corrective action including a command to cause the first network location to match the current failover location.

16. The non-transitory computer-readable medium of claim 15, further comprising instructions to cause the one or more processors to perform the operations:

receiving, from a second server device of the one or more server devices at the second network location, a third failover status message, comprising:

a fifth indication that the second server device received a third request message, the third request message including the current failover location; and a sixth indication that the second network location matches the current failover location; and wherein the current failover location is added to the third request message by a network application executing on a fourth server device of the one or more server devices at the first network location.

17. The non-transitory computer-readable medium of claim 16, wherein the network application includes an extension generated using a software development kit (SDK).

18. A system comprising:

one or more processors; and one or more computer-readable storage media storing instructions which, when executed by the one or more processors, cause the one or more processors to perform operations including:

outputting first failover information, the first failover information including a first designation of a first network location as a current failover location, wherein the first failover information is received by one or more server devices;

receiving, from a first server device of the one or more server devices at the first network location, a first failover status message, comprising:

a first indication that the first server device received a first request message, the first request message including the current failover location; and a second indication that the first network location matches the current failover location;

outputting second failover information, the second failover information including a second designation of a second network location as the current failover location, wherein the second failover information is received by the one or more server devices;

receiving, from the first server device at the first network location, a second failover status message, comprising:

a third indication that the first server device received a second request message, the second request message including the current failover location; and a fourth indication that the first network location does not match the current failover location;

outputting a failover failure notification, the failover failure notification including the fourth indication that the first network location does not match the current failover location; and responsive to the first network location not matching the current failover location, outputting a failover corrective action, the failover corrective action including a command to cause the first network location to match the current failover location.

19. The system of claim 18, further comprising instructions to cause the one or more processors to perform the operations:

receiving, from a second server device of the one or more server devices at the second network location, a third failover status message, comprising:

a fifth indication that the second server device received a third request message, the third request message including the current failover location; and a sixth indication that the second network location matches the current failover location; and wherein the current failover location is added to the third request message by a network application extension executing on a fourth server of the one or more server devices at the first network location.

20. The system of claim 19, wherein:

the network application extension is generated using an application programming interface (API) included in a software development kit (SDK); and a build configuration file causes the API to be included in the network application extension.

* * * * *